(No Model.)
R. D. SCOTT.
ROAD CART.
No. 403,148. Patented May 14, 1889.
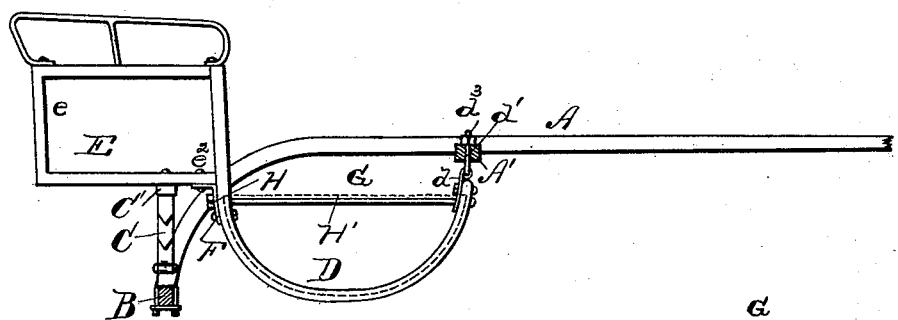
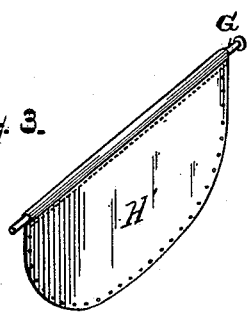
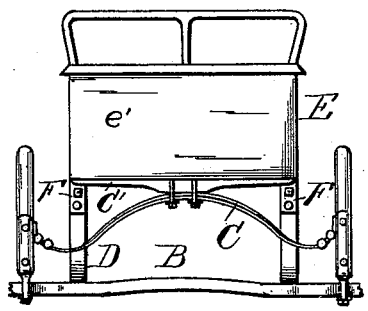
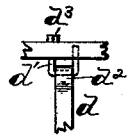
WITNESSES
Samuel E. Thomas
Walter H. Chamberlin
INVENTOR
Robert D. Scott.
By Wells W. Leggett & Co.
Attorneys.

UNITED STATES PATENT OFFICE.

ROBERT D. SCOTT, OF PONTIAC, MICHIGAN.

ROAD-CART.

SPECIFICATION forming part of Letters Patent No. 403,148, dated May 14, 1889.

Application filed January 10, 1889. Serial No. 295,996. (No model.)

*To all whom it may concern:*

Be it known that I, ROBERT D. SCOTT, a citizen of the United States, residing at Pontiac, county of Oakland, State of Michigan, have invented a certain new and useful Improvement in Road-Carts; and I declare the following to be a full, clear, and exact description of the invention, such as will enable others skilled in the art to which it pertains to make and use the same, reference being had to the accompanying drawings, which form a part of this specification.

My invention has for its object the production of a cheap and durable road-cart; and it consists of certain improvements, hereinafter described and claimed.

In the drawings, Figure 1 is a side elevation of my improved cart with the wheels removed. Fig. 2 is a rear elevation of the same. Fig. 3 is a view of the strengthening guard-rod with curtain attached, and Fig. 4 is a detail view of the forward end of one of the curved foot-board sills.

In carrying out my invention, A represents the shafts, A' the cross-bar thereof, B the axle, and C the spring, of my improved cart.

D represents the curved foot-board sills, which are attached to the cross-bar A' by the strap-irons $d$, which are bolted to the ends of the foot-board sills, and the staples $d'$, which are passed through the eyes $d^2$ of the strap-irons and extend up into the cross-bar, one end passing through and secured by the nut $d^3$ at the top. These curved foot-board sills may be made of either wood bent into shape or of iron; but I prefer to use the former, as being at once light and strong. Their rear ends extend up and terminate at the seat.

E is a box located under the seat, and is formed by the frame-work $e$ and panels $e'$ fastened thereon.

F are brackets placed on either foot-board sill at the point where the sills $e^2$ of the body join the former.

G are strengthening guard-rods extending on either side of the cart from the brackets F, through the foot-board sills, across to the forward ends of the foot-board sills, passing through the latter and secured by a nut.

H represent what may be termed "curtains" or "shields," of rubber or leather or other suitable material, which have one edge fastened to the rods G and the other ends fastened to the foot-board sills. Thus the space in front of the seat may be utilized as a receptacle for packages, &c., and the rod without the curtains would serve as a guard to prevent the robes or larger packages from dropping out.

The advantages of my improved road-cart will be at once seen. By making the foot-board sills curved and providing them with strengthening-rods a light, durable, and convenient and serviceable cart is obtained, and also one which is extremely cheap in construction. So, also, by providing the close body underneath the seat much of the complicated mechanism is dispensed with, and the common leaf-spring may be attached to the spring-bar C' and the latter attached at each end to the body-sill.

Admittance to the seat-box may be gained either by hinging the rear panel, $e'$, or by hinging the seat, or by making a panel in the seat removable.

What I claim is—

1. In a road - cart, the combination, with curved foot-board sills extending from the front backward and up to the seat, of a close body beneath the seat, the forward upright edges of the said body framed to the upright rear portions of the said curved foot-bar sills, substantially as described.

2. In a road-cart, the combination of curved foot-board sills D, extending from the front backward and up to the seat, a box beneath the seat having its forward upright edges framed to the upright portions of said sills, adapted to sustain the box, and rods G, passing through the bracket and joining the upright portions of the foot-board sills, substantially as described.

In testimony whereof I sign this specification in the presence of two witnesses.

ROBERT D. SCOTT.

Witnesses:
W. H. CHAMBERLIN,
L. A. DOELTZ.